United States Patent
DeGroot, Jr. et al.

[11] Patent Number: 5,990,231
[45] Date of Patent: Nov. 23, 1999

[54] ROOM TEMPERATURE VULCANIZING SILICONE RUBBER COMPOSITIONS AND PROCESS FOR MAKING

[75] Inventors: Jon Vierling DeGroot, Jr.; Carl Allen Fairbank, both of Midland, Mich.

[73] Assignee: Dow Corning Corporation, Midland, Mich.

[21] Appl. No.: 09/220,551

[22] Filed: Dec. 23, 1998

[51] Int. Cl.⁶ ............................................. C08G 5/54
[52] U.S. Cl. .................... 524/730; 524/731; 524/863; 528/18; 528/34
[58] Field of Search ..................... 524/863, 730, 524/731; 528/34, 18

[56] References Cited

U.S. PATENT DOCUMENTS

| | | | |
|---|---|---|---|
| 3,035,016 | 5/1962 | Bruner | 260/46.5 |
| 3,133,891 | 5/1964 | Ceyzeriat | 260/18 |
| 3,296,161 | 1/1967 | Kulpa | 260/18 |
| 4,261,758 | 4/1981 | Wright et al. | 106/287.12 |
| 4,304,897 | 12/1981 | Bluestein | 528/20 |
| 5,425,947 | 6/1995 | Hautekeer et al. | 524/267 |
| 5,488,124 | 1/1996 | Cobb et al. | 556/445 |
| 5,670,686 | 9/1997 | Cobb et al. | 556/445 |
| 5,744,703 | 4/1998 | Krenceski et al. | 73/54.01 |

*Primary Examiner*—Margaret G. Moore
*Attorney, Agent, or Firm*—Jennifer S. Warren; William F. Boley

[57] ABSTRACT

A one-component room temperature vulcanizable silicone rubber composition comprising (A) silanol end-terminated polyorganosiloxane base polymer, (B) organotriacyloxysilane cross-linker, (C) polysiloxane-polyether copolymer rheology modifier, and (D) particulate silica. The rheology modifying agent is particularly useful for adjusting the viscosity and plateau stress of the silicone rubber compositions.

22 Claims, No Drawings

ROOM TEMPERATURE VULCANIZING SILICONE RUBBER COMPOSITIONS AND PROCESS FOR MAKING

BACKGROUND OF INVENTION

The present invention is a one-component room temperature vulcanizing silicone rubber composition comprising a silanol end-terminated polyorganosiloxane base polymer, an organotriacyloxysilane, a polysiloxane-polyether copolymer as a rheology modifying agent, and a particulate silica. The rheology modifying agent is particularly useful for controlling the viscosity and plateau stress of such silicone rubber compositions.

One-component room temperature vulcanizing silicone rubber (RTV) compositions are well known in the art. Examples of such silicone RTV compositions are described in U.S. Pat. No. 3,035,016, U.S. Pat. No. 3,133,891, and U.S. Pat. No. 3,296,161. These silicone RTV compositions generally consist of a silanol end-terminated polydiorganosiloxane polymer, a silica filler, an organotriacyloxysilane as a cross-linking agent, and a metal salt of a carboxylic acid as a catalyst. The silicone RTV compositions cure to a solid elastic state at room temperature upon exposure to moisture commonly present in the atmosphere. Silicone RTV compositions are very useful in sealing and caulking applications where strong adhesion to various surfaces is important. Such uses of silicone RTV compositions often required that the compositions be placed in cracks and on surfaces having a vertical orientation or positioned overhead, therefore it is important that such compositions have viscosity and slump properties that allow them to be extruded freely into or onto cracks and surfaces and after placement the composition has limited slump.

Silica is used as a primary rheology control agent in many silicone RTV compositions. However silica is often the most expensive component of silicone RTV compositions, and therefore it is desirable to reduce the amount of silica in such compositions while maintaining the desired rheology properties. The present compositions comprise a novel group of polysiloxane-polyether copolymers as rheology modifiers. The degree of polymerization of the polysiloxane segment of the copolymers as well as the size and functionality of the polyether components can be varied within the described ranges to provide for silicone RTV compositions having rheology properties desirable for a particular application. Furthermore, these rheology additives can allow for the reduction of silica levels in silicone RTV compositions while maintaining desired rheology properties.

Wright et al., U.S. Pat. No. 4,261,758, teach a silicone RTV composition with sag-control comprising a silanol end-terminated polydiorganosiloxane polymer, at least 3 parts by weight of a fumed silica and as the sag-control ingredient, from 0.03 to 2 parts by weight of a polyether.

Bluestein, U.S. Pat. No. 4,304,897, teaches a silicone RTV composition having improved flow characteristic consisting of a silanol end-terminated linear polydiorganosiloxane base polymer, a filler, an organotriacyloxysilane cross-linker, a catalyst and a polyorganosiloxane copolymer consisting of a polysiloxane chain and a polyether chain which are linked together through various carboxyl alkyl radicals.

SUMMARY OF INVENTION

A one-component room temperature vulcanizable silicone rubber composition comprising (A) silanol end-terminated polyorganosiloxane base polymer, (B) organotriacyloxysilane cross-linker, (C) polysiloxane-polyether copolymer rheology modifier, and (D) particulate silica. The rheology modifying agent is particularly useful for adjusting the viscosity and plateau stress of the silicone rubber compositions.

DESCRIPTION OF INVENTION

The present invention is a one-component room temperature vulcanizable (RTV) silicone rubber composition having improved rheology properties. The composition comprises (A) 100 parts by weight of a silanol end-terminated polyorganosiloxane base polymer having a viscosity within the range of about 200 to about 500,000 mPa·s at 25° C. containing an average of from about 1.85 to 2 organic radicals per silicon atom and containing from about 0.02 weight percent to about 2 weight percent silicon-bonded hydroxyl radicals, (B) about 0.5 to 10 parts by weight of an organotriacyloxysilane cross-linker described by formula $$R^2Si(OY)_3, \qquad (1)$$

where $R^2$ is a monovalent hydrocarbon radicals comprising 1 to about 18 carbon atoms and Y is a saturated monoacyl radical of carboxylic acid, (C) about 0.2 to 10 parts by weight of a polysiloxane polyether copolymer described by formula $$R^3Si((OSiR^3{}_2)_xOSiR^3{}_2R^4)_3, \qquad (2)$$

where each $R^3$ is an independently selected monovalent hydrocarbon radical comprising 1 to about 18 carbon atoms, $x=0$ to 1000, and $R^4$ is described by formula $$-(CH_2)_aO(CH_2CH_2O)_b(CH_2CHR^5O)_cR^6, \qquad (3)$$

where $R^5$ is an alkyl radical comprising 1 to about 6 carbon atoms, $R^6$ is selected from the group consisting of hydrogen, monovalent hydrocarbon radicals comprising 1 to about 12 carbon atoms, and saturated monoacyl radicals of a carboxylic acid; $a=3$ to 12, $b=0$ to 100, $c=0$ to 100, and $b+c>0$, and (D) 1 to about 70 parts by weight of a particulate silica.

The polyorganosiloxanes comprising component (A) of the present invention are well known in the art and form the "base polymer" for the room temperature curable silicone rubber composition. These base polymers, which can comprise a single specie or a plurality of species, are liquids having a viscosity of from about 200 to about 500,000 mPa·s at 25° C. and contain an average of about 1.85 to 2 silicon-bonded organic radicals per silicon atom, with the organic radicals being selected from the group consisting of monovalent hydrocarbon radicals and halogenated monovalent hydrocarbon radicals with the organic radicals being attached to silicon through silicon-carbon linkages and with there being present in the base polymer from about 0.02 to 2 percent by weight silicon-bonded hydroxyl radicals.

In general the polyorganosiloxane base polymers comprise primarily diorganosiloxane units, with minor amounts of monoorganosiloxane units and triorganosiloxane units. The preferred polyorganosiloxane base polymer has the formula $$HO(R^1{}_2SiO)_nH, \qquad (4)$$

where $R^1$ is selected from the group consisting of monovalent hydrocarbon radicals and halogenated monovalent hydrocarbon radicals and n is a value within a range of about 20 to 3,000 or more. The preferred organic radicals represented by $R^1$ are selected from the group consisting of methyl, ethyl, phenyl, and 3,3,3-trifluoropropyl, with methyl being most preferred. The polyorganosiloxane base polymer can comprise a variety of molecules of different molecular weights and of different $R^1$ substituents as long as the average formula for the polyorganosiloxane base polymer falls within the limitations of component (A) as described above.

In addition to the linear silanol-terminated polyorganosiloxanes described by formula (1), the base polymer can also contain polyorganosiloxanes which are terminated at one end with triorganosiloxy units described by formula $R^1_3SiO_{0.5}$, with the other end of the polymer chain being terminated by a silanol group, where $R^1$ is as previously described. The base polymer chains can also contain monoorganosiloxy units described by formula $R^1SiO_{1.5}$, where $R^1$ is as previously described.

In the present invention the polyorganosiloxane base polymer has a viscosity in the range of about 200 to 500,000 mPa·s at 25° C. It is preferred that the polyorganosiloxane base polymer have a viscosity in the range of about 200 to 100,000 mPa·s at 25° C.

The organotriacyloxysilane cross-linkers comprising component (B) as described by formula (1) are well known in the art. About 0.5 to 10 parts by weight, per 100 parts by weight of the polyorganosiloxane base polymer, of the organotriacyloxysilane is added to the present composition. Preferred is when about 2 to 8 parts by weight of the organotriacyloxysilane is added, on the same basis. The acyl radical represented by Y is a saturated monoacyl radical of a carboxylic acid. The preferred Y radicals are those containing up to about 12 carbon atoms, with up to about 8 carbon atoms being most preferred. It is preferred that Y be acetyl. In formula (1), $R^2$ can be a monovalent hydrocarbon radical comprising 1 to about 18 carbon atoms. $R^2$ can be a substituted monovalent hydrocarbon radical such as 3,3,3-trichloropropyl, chloromethyl, and chloromethyltolyl. It is preferred that $R^2$ be a lower alkyl such as methyl, ethyl, propyl, butyl, octyl, or an aryl radical such as phenyl or tolyl. Preferred is when the organotriacyloxysilane is methyltriacetoxysilane.

The present composition comprises about 0.2 to 10 parts by weight, per 100 parts by weight of the polyorganosiloxane base polymer, of a polysiloxane-polyether copolymer described by formula (2). Preferred is when the present composition comprises about 1 to 5 parts by weight of the polysiloxane-polyether copolymer, on the same basis. In formula (2), each $R^3$ is an independently selected monovalent hydrocarbon radical comprising 1 to about 18 carbon atoms. $R^3$ can be a unsubstituted or substituted monovalent hydrocarbon radical. Preferred is when each $R^3$ is a monovalent hydrocarbon radical comprising 1 to about 6 carbon atoms. $R^3$ can be, for example, alkyls such as methyl, ethyl, propyl; aryls such as phenyl and tolyl; substituted alkyls such as 3,3,3-trifluoropropyl and chloromethyl; and substituted aryls such as chloromethyltolyl. Preferred is when each $R^3$ is an independently selected alkyl radical comprising one to about 6 carbon atoms, with methyl being most preferred.

In formula (2), $R^4$ is described by formula $$-(CH_2)_aO(CH_2CH_2O)_b(CH_2CHR^5O)_cR^6. \qquad (3)$$

In formula (3), $R^5$ is an alkyl radical comprising 1 to about 6 carbon atoms. $R^5$ can be, for example methyl, ethyl, propyl, and tert-butyl. It is preferred that $R^5$ be selected from the group consisting of methyl and ethyl. In formula (3), $R^6$ is selected from the group consisting of hydrogen, monovalent hydrocarbon radicals comprising 1 to about 12 carbon atoms, and saturated monoacyl radicals of a carboxylic acid. When $R^6$ is a monovalent hydrocarbon radical it can be, for example, an alkyl such as methyl, ethyl, propyl, and tert-butyl. When $R^6$ is a monoacyl radical of a carboxylic acid it can be the same as described for Y in formula (1). When $R^6$ is a monoacyl radical of a carboxylic acid, it is preferred that $R^6$ be acetyl. It is preferred that $R^6$ be hydrogen. In formula (3), a=3 to 12. It is preferred that a=3 to 6, with a=3 being most preferred. In formula (3), b=0 to 100. It is preferred that b=12 to 30, with b=18 or b=24 being most preferred. In formula (3), c=0 to 100. It is preferred that c=6 to 24, with c=12 or c=18 being most preferred. In formula (3), b+c>0, with b+c=36 being preferred.

Preferred examples of polysiloxane-polyether copolymers useful in the present invention are described by average formulas

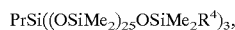

$PrSi((OSiMe_2)_{25}OSiMe_2R^4)_3$, where Me is methyl, Pr is n-propyl, and $R^4$ is selected from the group consisting of $-(CH_2)_3O(CH_2CH_2O)_{18}(CH_2CH(CH_3)O)_{18}H$ and $-(CH_2)_3O(CH_2CH_2O)_{18}(CH_2CH(CH_2CH_3)O)_{18}H$. Methods for preparing such polymers are known in the art and can be effected by reaction of a hydridosiloxane and polyether or olefin in the presence of a platinum or platinum compound catalyst.

The present composition requires about 1 to 70 parts by weight per 100 parts by weight of component (A) of a particulate silica. Preferred is when the composition comprises about 5 to 50 parts by weight of the particulate silica, on the same basis. Even more preferred is about 5 to 10 parts by weight of the particulate silica, on the same basis. The particulate silica can be either precipitated silica or fumed silica. Preferred is when the particulate silica is a fumed silica. Preferred is a particulate silica having a surface area within a range of about 50 m²/g to 750 m²/g. Even more preferred is a silica having a surface area within a range of about 100 m²/g to 500 m²/g. Although the particulate silica may be treated with standard treating agents known for treating silicas to make them hydrophobic such as linear and cyclic siloxanes, silanes, and silazanes; it is preferred that the particulate silica not be treated for use in the present compositions. The inventors believe that in the present composition a principal role of the polysiloxane-polyether copolymer is the treatment of the silica filler and that this treatment in large measure provides the observed effects on the rheology properties of the compositions.

Various extenders and non-reinforcing fillers can be added to the present compositions as long as they do not adversely effect the desired rheology properties of the compositions. Examples of such fillers may include titanium dioxide, zinc oxide, calcium carbonate, magnesium oxide, calcined clay, carbon, graphite, and quartz.

Additional conventional ingredients can also be included in the present compositions such as adhesion promoters, flame retardants, stabilizing agents, and pigments, provided such ingredients to not adversely affect desired properties of the composition such as rheology properties.

The cure of the present composition may be accelerated by adding to it a catalyst. The catalyst may be a carboxylic acid salt of a metal ranging from lead to manganese, inclusive, in the electromotive series of metals. Such metals include lead, tin, nickel, cobalt, iron, cadmium, chromium, zinc, and manganese, with tin being preferred. The carboxylic acids from which the salts of the metal catalyst are derived can be monocarboxylic acids or dicarboxylic acids, and the metallic salts can be either soluble or insoluble in the polyorganosiloxane base polymer. Preferably, the metals salts used as catalyst are soluble in the polyorganosiloxane base polymer to facilitate the uniform dispersion of the metal salt in the present composition.

Examples of metal salts which can be used in the present composition as catalyst include zinc-naphthenate, lead-naphthenate, cobalt-naphthenate, cobalt octoate, zinc-octoate, lead-octoate, chromium-octoate, tin-octoate, carbomethyoxyphenyl tin trisuberate, isobutyl tin triceroate, cyclohexenyl lead triacotinate, xenyl lead trisalicylate, dimethyl tin dibutyrate, dibuty tin diacetate, dibutyl tin dilaurate, divinyl tin diacetate, dibutyl tin dibenzoate, dibutyl tin dioctate, dibutyl tin maleate, dibutyl tin adipate, and diisoamyl tin bistrichlorobenzoate. Examples of other metal compounds which may be useful as catalyst in the present composition are described is U.S. Pat. No. 4,304,897, which is hereby incorporated by reference for such teachings. A preferred catalyst for use in the present composition is dibutyl tin diacetate.

The amount of catalyst added to the present composition can vary depending upon the particular catalyst and the desired cure rate. Generally about 0.01 to about 5 parts by weight of the catalyst per 100 parts by weight of the polyorganosiloxane base polymer is considered useful. Preferred is a catalyst concentration within a range of about 0.1 to 2 parts by weight of the catalyst, on the same basis.

In a preferred embodiment of the present invention, a mixture of the reinforcing particulate silica (component (D)) and the polysiloxane polyether-copolymer (component (C)) is formed and then added to the polyorganosiloxane base polymer (component (A)) or in the alternative the reinforcing particulate silica and the polysiloxane-polyether copolymer are added simultaneously to the polyorganosiloxane base polymer. It is generally preferred that the reinforcing particulate silica not be added to the polyorganosiloxane base polymer followed by the sequential addition of the polysiloxane-polyether copolymer, since this method of addition may reduce the desired effects of the copolymer in the composition.

The following examples are provided to illustrate the present invention. These examples are not intended to limit the scopes of the claims herein.

EXAMPLES

One-component room temperature vulcanizable silicone compositions were formed comprising 86 weight percent of hydroxy end-terminated polydimethylsiloxane polymer having a viscosity of 16,500 mPa·s at 25° C., about 6 weight percent of approximately a 1:1 weight percent mixture of methyltriacetoxysilane and ethyltriacetoxysilane, 8.5 weight percent of silica filler, 0.025 weight percent of dibutyltin dilaurate, and polysiloxane-polyether copolymer additives as described in Tables 1 and 2. The compositions were formed by placing the hydroxy end-terminated polydimethylsiloxane polymer in a mixer followed by the addition, where added, of the copolymer additive and mixing for 15 seconds. The methyltriacetoxysilane/ethyltriacetoxysilane mixture was then added to the mixer followed by one-half of the silica filler and mixing continued for another 15 seconds. Then, the second-half of the silica filler was added to mixer, mixing continued for 15 seconds, and the dibutyltin dilaurate added followed by an additional 15 second mixing. The compositions were centrifuged to remove air and allowed to age for 6–7 days under anhydrous conditions at room temperature before measuring the rheology properties.

The rheological properties of the aged compositions were measured using a CarriMed CS50 rheometer (TA Instruments, New Castle, Del.) with a two centimeter diameter cone fixture (0.5 degree angle, 13 micron truncation). Since the compositions start curing upon exposure to air, the upward portion of the stress sweep was eliminated to reduce the time for the measurement. The stress sweep protocol consisted of (1) a 30 second hold at 25,000 dynes/cm$^2$ and (2) a ramp stress down from 25,000 dyne/cm$^2$ to 1,000 dynes/cm$^2$ over 5 minutes. The values reported in Tables 1 and 2 are the viscosity at the end of the 20 second hold and the last value of stress for which flow was detectable (Plateau Stress).

The polysiloxane-polyether siloxanes tested as rheological modifying agents were of the general formula

Pr—Si((OSiMe$_2$)$_x$OSiMe$_2$R$^4$)$_3$ where Pr is n-propyl, Me is methyl, x is as described in Tables 1 and 2, R$^4$ is either hydrogen or represented by the formula

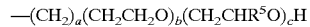

—(CH$_2$)$_a$(CH$_2$CH$_2$O)$_b$(CH$_2$CHR$^5$O)$_c$H where R$^5$ is methyl (Me) or ethyl (Et) and the values for a, b, and c are as described in Tables 1 and 2.

TABLE 1

Rheology Results for Compositions Comprising Undensified Silica Having a BET of 195 m$^2$/g

| Sample No. | Additive (Wt. %) | R$^4$ | R$^5$ | x | a | b | c | Visc. (Pa · s) | Plat. Stress (dynes/cm$^2$) |
|---|---|---|---|---|---|---|---|---|---|
| 1-1 | 2.6 | H | — | 25 | — | — | — | 1,485 | 9,813 |
| 1-2 | 2.6 | H | — | 100 | — | — | — | 1,865 | 10,740 |
| 1-3 | 0.9 | H | — | 100 | — | — | — | 1,800 | 9,900 |
| 1-4 | 2.6 | formula | Me | 25 | 3 | 18 | 18 | 3,624 | 10,170 |
| 1-5 | 2.6 | formula | Me | 100 | 3 | 18 | 18 | 4,973 | 11,960 |
| 1-6 | 0.9 | formula | Me | 100 | 3 | 18 | 18 | 2,390 | 10,260 |
| 1-7 | none | — | — | — | — | — | — | 1,650 | 8,700 |

TABLE 2

Rheology Results for Compositions Comprising Densified Silica Having a BET Surface Area of 200 m²/g

| Sample No. | Additive (Wt. %) | R⁴ | R⁵ | x | a | b | c | Visc. (Pa·s) | Plat. Stress (dynes/cm²) |
|---|---|---|---|---|---|---|---|---|---|
| 2-1 | 2.6 | H | — | 25 | — | — | — | 1301 | 8,652 |
| 2-2 | 2.6 | H | — | 100 | — | — | — | 1448 | 9,641 |
| 2-3 | 2.6 | formula | Me | 25 | 3 | 18 | 18 | 1922 | 9,813 |
| 2-4 | 2.6 | formula | Me | 100 | 3 | 18 | 18 | 2403 | 10,740 |
| 2-5 | 2.6 | formula | Me | 250 | 3 | 18 | 18 | 2631 | 9,989 |
| 2-6 | 2.6 | formula | Et | 100 | 3 | 24 | 12 | 2476 | 10,740 |
| 2-7 | none | — | — | — | — | — | — | 1557 | 8,810 |

Samples of the compositions described in Tables 1 and 2 were cured under ambient conditions for a period of 7 days and then tested for physical properties. Tensile strength, Modulus at 100%, and Elongation were tested by ASTM D412 test methods and Shore A durometer (Duro.) by ASTM 2240 test method. The results of this testing are reported in Tables 3 and 4.

TABLE 3

Physical Property of Cured Silicone Compositions

| Sample No. | Tensile (MPa) | Modulus (MPa) | Elongation (%) | Durometer (Shore A) |
|---|---|---|---|---|
| 1–1 | 1.50 | 0.407 | 648 | 25 |
| 1–2 | 1.54 | 0.414 | 679 | 25 |
| 1–4 | 1.34 | 0.338 | 668 | 22 |
| 1–5 | 1.52 | 0.393 | 694 | 21 |
| 1–7 | 1.79 | 0.427 | 617 | — |

TABLE 4

Physical Property of Cured Silicone Compositions

| Sample No. | Tensile (MPa) | Modulus (MPa) | Elongation (%) | Durometer (Shore A) |
|---|---|---|---|---|
| 2–1 | 1.19 | 0.352 | 540 | 27 |
| 2–2 | 1.25 | 0.365 | 550 | 26 |
| 2–3 | 1.37 | 0.310 | 686 | 23 |
| 2–4 | 1.37 | 0.338 | 632 | 26 |
| 2–6 | 1.39 | 0.338 | 640 | 26 |
| 2–7 | 1.57 | 0.379 | 658 | 25 |

We claim:

1. A one-component room temperature vulcanizable silicone rubber composition comprising (A) 100 parts by weight of a silanol end-terminated polyorganosiloxane base polymer having a viscosity within the range of about 200 to about 500,000 mPa·s at 25° C. containing an average of from about 1.85 to 2 organic radicals per silicon atom and containing from about 0.02 weight percent to about 2 weight percent silicon-bonded hydroxyl radicals, (B) about 0.5 to 10 parts by weight of an organotriacyloxysilane cross-linker described by formula $$R^2Si(OY)_3,$$

where $R^2$ is a monovalent hydrocarbon radical comprising 1 to about 18 carbon atoms and each Y is an independently selected saturated monoacyl radical of carboxylic acid, and (C) about 0.2 to 10 parts by weight of a polysiloxane-polyether copolymer described by formula $$R^3Si((OSiR^3{}_2)_xOSiR^3{}_2R^4)_3,$$

where each $R^3$ is an independently selected monovalent hydrocarbon radical comprising 1 to about 18 carbon atoms, x=0 to 1000, and $R^4$ is described by formula $$-(CH_2)_aO(CH_2CH_2O)_b(CH_2CHR^5O)_cR^6,$$

where $R^5$ is an alkyl radical comprising 1 to about 6 carbon atoms, $R^6$ is selected from the group consisting of hydrogen, monovalent hydrocarbon radicals comprising 1 to about 12 carbon atoms, and saturated monoacyl radicals of a carboxylic acid; a=3 to 12, b=0 to 100, c=0 to 100, and b+c>0, and (D) 1 to about 70 parts by weight of particulate silica.

2. A composition according to claim 1, where the silanol end-terminated polyorganosiloxane base polymer is described by formula $$HO(R^1{}_2SiO)_nH,$$

where $R^1$ is selected from the group consisting of monovalent hydrocarbon radicals and halogenated monovalent hydrocarbon radicals and n is a value within a range of about 20 to 3,000.

3. A composition according to claim 2, where $R^1$ is selected from the group consisting of methyl, ethyl, phenyl, and 3,3,3-trifluoropropyl.

4. A composition according to claim 3, where $R^1$ is methyl.

5. A composition according to claim 1, where the silanol end-terminated polyorganosiloxane base polymer has a viscosity in the range of about 200 to 100,000 mPa·s at 25° C.

6. A composition according to claim 1, where the organotriacyloxysilane comprises about 2 to 8 parts by weight per 100 parts by weight of the silanol end-terminated polyorganosiloxane base polymer.

7. A composition according to claim 1, where the substituent Y comprises up to about 8 carbon atoms.

8. A composition according to claim 1, where the substituent Y is acetyl.

9. A composition according to claim 1, where the organotriacyloxysilane is methyltriacetoxysilane.

10. A composition according to claim 1, where the polysiloxane-polyether copolymer comprises about 1 to 5 parts by weight per 100 parts by weight of the silanol end-terminated polyorganosiloxane base polymer.

11. A composition according to claim 1, where $R^3$ is a monovalent hydrocarbon radical comprising 1 to about 6 carbon atoms.

12. A composition according to claim 1, where $R^3$ is methyl.

13. A composition according to claim 1, where $R^5$ is selected from the group consisting of methyl and ethyl.

14. A composition according to claim 1, where $R^6$ is acetyl.

15. A composition according to claim 1, where $R^6$ is hydrogen.

16. A composition according to claim 1, where a=3 to 6, b=12 to 30, and c=6 to 24.

17. A composition according to claim 1, where a=3, b=18 or 24, c=18 or 24, and b+c=36.

18. A composition according to claim 1, where the polysiloxane-polyether copolymer is described by average formula $$PrSi((OSiMe_2)_{25}OSiMe_2R^4)_3,$$

where Me is methyl, Pr is n-propyl, and $R^4$ is selected from the group consisting of —$(CH_2)_3O(CH_2CH_2O)_{18}(CH_2CH(CH_3)O)_{18}H$ and
—$(CH_2)_3O(CH_2CH_2O)_{18}(CH_2CH(CH_2CH_3)O)_{18}H$.

19. A composition according to claim 1, further comprising a catalyst comprising a carboxylic acid salt of a metal ranging from lead to manganese, inclusive, in the electromotive series of metals.

20. A composition according to claim 19, where the catalyst is dibutyl tin diacetate.

21. A composition according to claim 1, where a mixture of the reinforcing particulate silica and the polyether-copolymer is formed and then added to the silanol end-terminated polyorganosiloxane base polymer.

22. A composition according to claim 1, where the reinforcing particulate silica and the polysiloxane-polyether copolymer are added simultaneously to the silanol end-terminated polyorganosiloxane base polymer.

* * * * *